(12) United States Patent
Odawara et al.

(10) Patent No.: US 7,487,400 B2
(45) Date of Patent: Feb. 3, 2009

(54) METHOD FOR DATA PROTECTION IN DISK ARRAY SYSTEMS

(75) Inventors: Hiroaki Odawara, Sunnyvale, CA (US); Yuichi Yagawa, San Jose, CA (US); Shoji Kodama, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/512,664

(22) Filed: Aug. 29, 2006

(65) Prior Publication Data

US 2006/0294438 A1 Dec. 28, 2006

Related U.S. Application Data

(63) Continuation of application No. 10/871,128, filed on Jun. 18, 2004, now abandoned.

(51) Int. Cl.
*G06F 11/00* (2006.01)

(52) U.S. Cl. .................. 714/41; 714/6; 714/31; 714/42

(58) Field of Classification Search .......... 714/6, 714/7, 30, 31, 41, 42
See application file for complete search history.

(56) References Cited

U.S. PATENT DOCUMENTS

| | | | | |
|---|---|---|---|---|
| 5,473,776 A * | 12/1995 | Nosaki et al. | ............... | 707/200 |
| 5,574,855 A * | 11/1996 | Rosich et al. | ............... | 714/41 |
| 5,590,272 A * | 12/1996 | Murata et al. | ............... | 714/2 |
| 5,655,150 A * | 8/1997 | Matsumoto et al. | ........... | 710/17 |
| 5,835,703 A * | 11/1998 | Konno | ............... | 714/42 |
| 5,889,934 A * | 3/1999 | Peterson | ............... | 714/6 |
| 6,434,498 B1 * | 8/2002 | Ulrich et al. | ............... | 702/115 |
| 6,542,962 B2 * | 4/2003 | Kodama et al. | ............... | 711/114 |
| 6,583,947 B1 * | 6/2003 | Hakamata et al. | ............ | 360/69 |
| 6,826,005 B2 * | 11/2004 | Hakamata et al. | ............ | 360/69 |
| 2002/0095602 A1 * | 7/2002 | Pherson et al. | ............ | 713/201 |
| 2002/0169996 A1 * | 11/2002 | King et al. | ............... | 714/8 |
| 2003/0131193 A1 * | 7/2003 | Kodama et al. | ............... | 711/114 |
| 2003/0229651 A1 * | 12/2003 | Mizuno et al. | ............... | 707/200 |
| 2005/0081087 A1 * | 4/2005 | Yagisawa et al. | ............ | 714/5 |
| 2005/0114557 A1 * | 5/2005 | Arai et al. | ............ | 710/5 |

* cited by examiner

*Primary Examiner*—Joshua A Lohn
(74) *Attorney, Agent, or Firm*—Mattingly, Stanger, Malur & Brundidge, PC (57) ABSTRACT

A method and a system for implementing the method are disclosed relating to archival storage of information in large numbers of disk units. The reliability of the stored information is checked periodically using data verification operations whose results are saved. These results establish the veracity of the data and enable compliance with various regulatory requirements. The techniques described enable the use of low cost disk drive technology, yet provide high assurance of data veracity. In a typical system, management information storage is provided in which data entries are associated with each of the disk drives to provide information with respect to the condition of the data on that drive and its last verification. The data verification operations are performed on the data during time periods when I/O accesses are not required.

18 Claims, 10 Drawing Sheets

Figure 1

Current mode field :

0 = Normal mode (with power saving operation)
　　& the logical/physical devices are in operation
1 = Normal mode (with power saving operation)
　　& the logical/physical devices are out of operation (being turned off)
2 = Normal mode (with power saving operation)
　　& the logical/physical devices are in data verification mode
3 = Full operation mode (no power saving operation)
4 = Error handling mode
5-15 = reserved

METHOD FOR DATA PROTECTION IN DISK ARRAY SYSTEMS

This application is a continuation of U.S. patent application Ser. No. 10/871,128, filed Jun. 18, 2004, the entire disclosure of which is incorporated herein by reference.

BACKGROUND OF THE INVENTION

This invention relates generally to storage systems, and in particular to the long term reliable storage of verifiable data in such systems.

Large organizations throughout the world now are involved in millions of transactions which include enormous amounts of text, video, graphical and audio information which is categorized, stored, accessed and transferred every day. The volume of such information continues to grow rapidly. One technique for managing such massive amounts of information is the use of storage systems. Conventional storage systems can include large numbers of disk drives operating under various control mechanisms to record, back up and enable reproduction of this enormous amount of data. This rapidly growing amount of data requires most companies to manage the data carefully with their information technology systems.

Recently, new standards have been promulgated from various governmental entities which require corporations and other entities to maintain data in a reliable manner for specified periods. Such regulations, for example the Sarbanes-Oxley Act and the SEC regulations, require public companies to preserve certain business information which can amount to hundreds of terabytes. As a result, such organizations seek technologies for the management of data in a cost-effective manner by which data which is accessed infrequently is migrated to low performance or less expensive storage systems. This factor combined with the continuing reductions in manufacturing costs for hard disk drives has resulted in disk drives replacing many magnetic tape and optical disk library functions to provide archival storage. As the cost per bit of data stored in hard disk drives continues to drop, such systems will be increasingly used for archival storage.

Traditional high performance disk-based storage systems for enterprise information technology are usually equipped with high performance, high reliability hard disk drives. These systems are coupled to servers or other computers using high speed interfaces such as FibreChannel or SCSI, both of which are known standard protocols for information transfer. On the other hand, personal computers and inexpensive servers often utilize low performance, lower reliability disk drives with conventional low speed interfaces such as ATA or IDE. The lower reliability and performance of such hard disk drives allow them to be manufactured in mass production with low prices. These low priced disk drives can often be used in storage system products for archival storage. Examples include the Clarion and Centera products from EMC, NearStore from Network Appliance, and BladeStore from StorageTek.

In archival storage, the archived data is accessed only intermittently, for example on the order of a few times per year. As a result, performance is not an issue in the usual situation, but reliability is still of utmost concern. In addition to the usual internal desires for the retention of information in a reliable manner, often the data on these storage systems is covered by governmental regulations which require that it not be lost or modified. In addition, the low frequency of access to the data allows system designers to design the system in a manner by which the disk drives are turned off when they are not accessed, thereby reducing power consumption. Unfortunately, keeping hard disk drives off for long periods of time can also cause corruption of the recording media and the read/write devices. In many such archival systems, intentional, or even accidental modification of the data, for example by manual operator intervention or by software, is blocked using secure authentication mechanisms. To maintain highest data reliability, any data corruption or sector failure on one of the hard disk drives needs to be recovered, or at least detected and reported.

Accordingly, there is a need for storage systems using disk arrays by which low reliability hard disk drives can be employed in a reliable way, yet be prevented from data corruption or loss of data.

BRIEF SUMMARY OF THE INVENTION

In a typical implementation invention, a controller and a group of typically lower reliability hard disk drives are provided. Data stored on these disk drives is periodically retrieved and verified to assure reliability. A mechanism is provided to selectively turn off the hard disk drives when there is no access from the host computer connected to the storage system. The controller periodically turns on various ones of the disk drives when necessary and when it conducts a data verification procedure. The results of the verification procedure are stored into a nonvolatile, secure location so that the information can be accessed by anyone seeking assurance about the integrity of the archived data.

The archived data can be verified using a number of different techniques. In one technique all of the data in a particular disk drive is read sequentially. If any bad sectors are detected, the sector number is reported to the controller, and the controller then performs a data recovery process. The data recovery process can employ typical RAID mirroring, back up and error correction technology. Such technology generally allows a back up copy, parity bits or error correction codes to be read and used to correct bad data. This enables the system controller to detect accidental or spontaneous corruption in a bit-wise manner, normally not detectable by reading the hard disk drive data.

Alternatively, the data verification may employ multiple read sequences spread over a longer time period. For example, during a specified verification period, only a predetermined portion of the data on the hard disk drive will be read and verified. Such a verification operation is later repeated for every portion of the disk drive, thereby verifying the entire contents of the disk drive. This procedure is especially useful in newer, large capacity hard disk drives, often having storage capabilities of hundreds of gigabytes, because it may take many hours (e.g., ten) to check all of the data in conjunction with the parity groups. It is also desirable to segment the data verification procedure because, from a mechanical viewpoint, it is preferable for ATA-type disk drives to be turned on frequently.

The techniques of this invention may be implemented using a variety of approaches. In one implementation a management table is provided for maintaining information about the contents of each disk drive. The management table can include information such as whether the hard disk drive is on, off, or in a data verification mode. The table also may store when the drive was last turned on, and for how long it has been off. Data may also be provided in the management table for indicating whether the data verification procedures are to be performed in a particular manner, and, if they have been performed in a segmented manner, providing an indication of the last sector or other address of the disk drive checked.

Records may be maintained of parity groups and logical units, and of the time the disk drive has been on, or the time since data verification began.

Preferably, systems implementing the techniques of this invention provide data verification. In one implementation a microprocessor is provided in a storage controller coupled to the array of disks. The microprocessor performs the data verification, for example, by doing a comparison operation between each drive in a mirrored pair. Passes or failures of the comparison are marked as such. If desired, special purpose hardware for parity checking or error correction codes may also be included. It is also desirable to provide control features for the data verification operations, for example changing the settings or procedures for such operations. Such setting changes can be implemented using commands from a service processor, or commands issued from a terminal or keyboard by a maintenance engineer. Of course, commands may also be issued through a network coupled to the storage system.

It is also advantageous in systems implementing the techniques of this invention to store the data verification logs in a manner to control access to them. As such they may be encrypted or secured using a variety of known techniques. Such an approach helps assure that an audit of the system will demonstrate the integrity of the archived data.

In other implementations of the invention, it is desirable to have a special mode for the storage system operation in which all the disk drives are maintained with power on. When an audit of the archived data is performed, the search can be done more quickly.

In a preferred embodiment for a storage system having a plurality of disk drives, each with stored data, a system for verifying the integrity of the stored data includes a management information storage which includes data entries therein associated with the disk drives and which indicate whether the data stored on the disk drives has been verified. The verification operations themselves are typically performed by a processor, usually a microprocessor, situated in the storage controller managing the operation of the disk array.

DETAILED DESCRIPTION OF THE INVENTION

Figure 1:
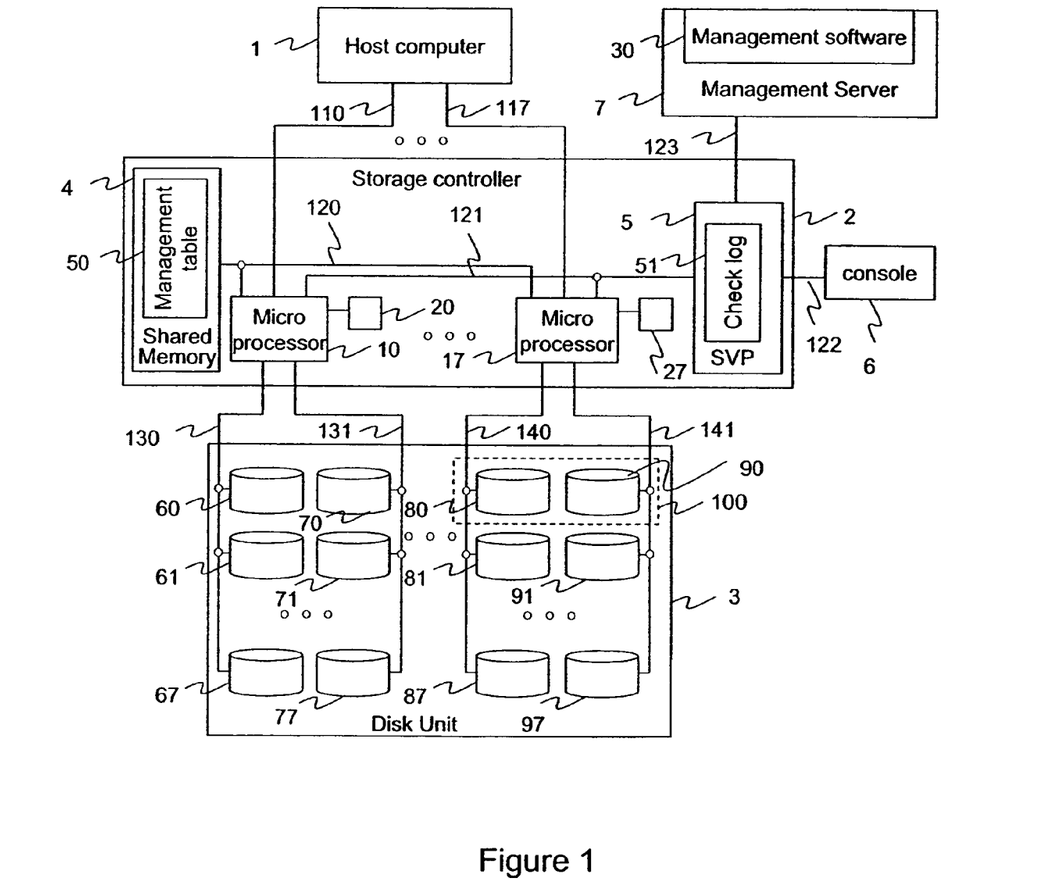
FIG. 1 is a block diagram for storage system illustrating a typical implementation for one embodiment of the invention.

FIG. 1 is a block diagram of a typical system configuration for a first embodiment of this invention. FIG. 1 illustrates the basic components of a typical system, including a host computer 1 coupled through a storage controller 2 to a disk unit 3. An interface 110, 117 couples the host computer to the storage controller, while another interface 130, 131, 140, 141 couples the storage controller to the disk unit. Preferably the disk unit will include a large number of disk drives, as represented by the cylindrical shapes in FIG. 1.

The storage controller 2 includes shared memory 4, a service processor 5, and processors 10 . . . 17. The processors 10 . . . 17 are preferably microprocessors, and are coupled to local memories 20 . . . 27 which store the program and/or data used by the microprocessors 10 . . . 17. In some implementations the local memory may be implemented as a ROM on the same chip as the microprocessor circuitry. The shared memory 4 is shared among all of the microprocessors via a signal line 120. (For simplicity in the diagram, the interconnections among components shown in FIG. 1 are illustrated as single lines. In an actual implementation, however, these single lines will usually be implemented as a bus with a plurality of lines for address, data, control, and other signals.)

Shared memory 4 includes a management table 50 which is described below. The microprocessors 10 . . . 17 are also connected, preferably using a local area network 121, to a service processor 5 which handles various operations for maintenance purposes in the system. This service processor is typically connected via interconnection 123 to a management server 7 which contains management software 30 for controlling the operations of the service processor 5. In addition, a console 6 is coupled to processor 5 via line 122 to enable manual operations to be performed on SVP 5.

The disk unit 3 includes many units for storing information. These are preferably hard disk drives or other well known storage apparatus. In the case of hard disk drives, the drives 60-67, 70-77, 80-87 and 90-97 are all interconnected via buses 130, 131, 140 and 141 to the microprocessors 10-17. In the typical implementation the disk drives are paired to provide RAID 1 functionality. For example, drives 80 and 90 provide two disk drives in a mirrored pair. The number of disk drives, microprocessors and particular RAID or other redundancy techniques selected can be altered for different implementations of the storage systems shown in FIG. 1.

Figure 2:
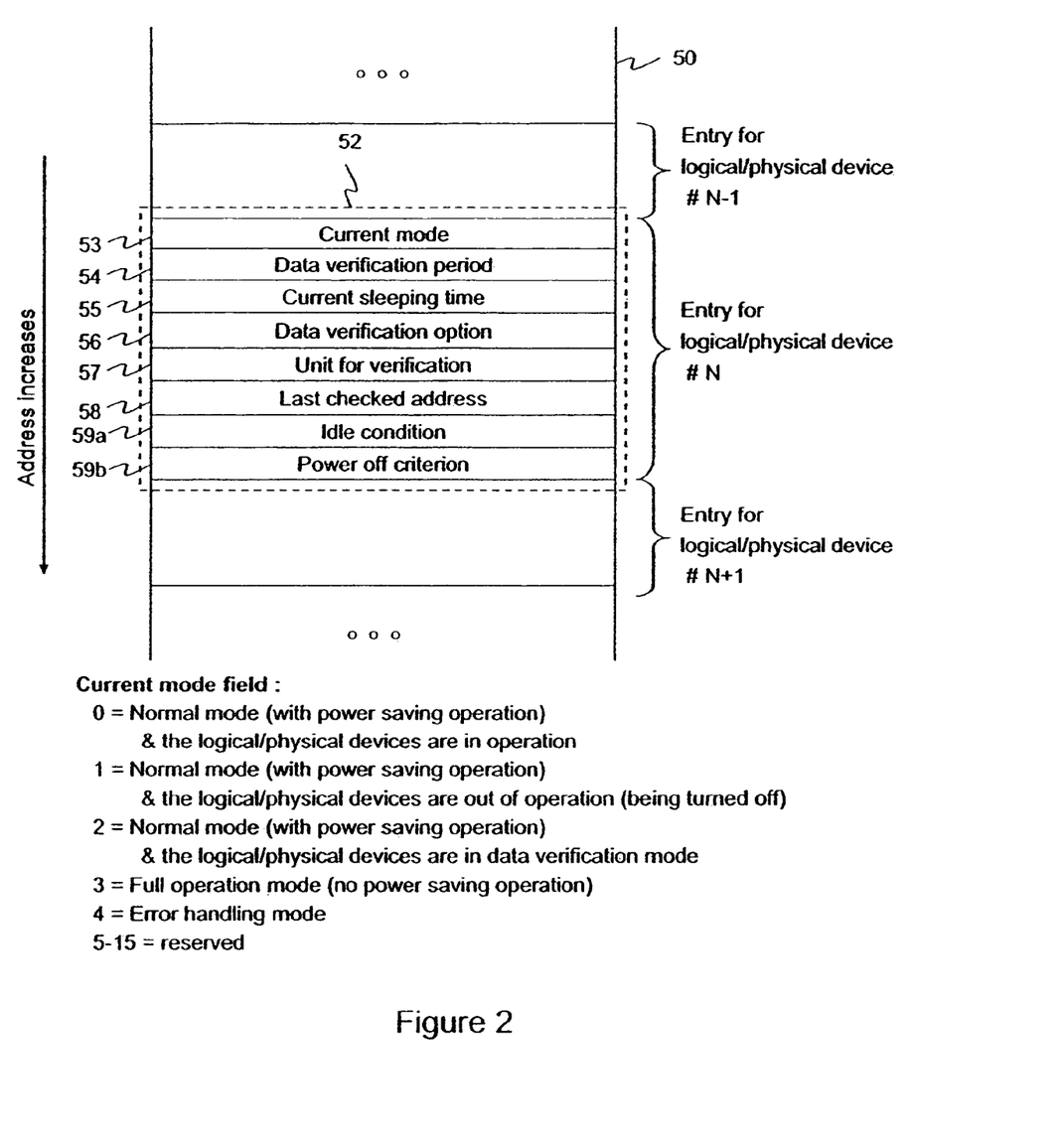
FIG. 2 illustrates a management table for use in conjunction with FIG. 1.

The system illustrated in FIG. 1 has two major modes of operation—a "normal" mode and a "full operation" mode. The particular mode of operation is specified by a field in management table 50 (as shown in FIG. 2). Depending upon the particular implementation, the mode chosen may be based on mirrored pairs or on other physical/logical configurations, for example, a RAID 5 parity group, etc. In the normal mode of operation, the hard disk drives in a mirrored pair are off, and are turned on for data verification operations or input/output (I/O) operations. This form of operation will be described in detail below. In the full operation mode, the mirrored pair is always running and is never turned off. This mode of operation is also described in detail below.

Setting and changing the modes of operation may be implemented in different ways. In one implementation an operator uses console 6 to set or change mode settings by specifying the identification of the disk drive pair and the desired mode. In another implementation management software 30 sets or changes the mode settings using an applications programming interface (API) with the SVP 5. In either case the specified mode setting is handled by the SVP 5 and communicated to the appropriate microprocessor 10-17 with the management table 50 also being updated at that time, usually by the microprocessor 10-17.

FIG. 2 is a diagram illustrating a typical implementation of the management table 50 shown in FIG. 1. As mentioned above, each mirrored pair of disk drives in FIG. 1 has an entry in the table, and those entries have a common format. For example, the entry 52 for the Nth one of the pairs 100 typically includes the information shown within dashed line 52. The current mode field 53 identifies the current operational mode of the corresponding pair. Typical contents in a preferred embodiment for the "current mode" register or table entry are shown in the lower portion of FIG. 2. For example, a "0" in field 53 indicates that this pair is in the normal mode of operation and is implementing a power-saving feature. In a similar manner, a "1" in that field indicates that the mirrored pair is in the normal mode of operation, but is turned off. A "2" indicates a normal mode of operation, but a data checking or verification operation; a "3" indicates full operational mode with no power-saving implemented. A "4" indicates an error-handling mode. Of course, additional modes can be specified using additional data if desired.

Field 54 in the management table 50 shown in FIG. 2 identifies the time period when data verification or checking is to be triggered. The field 55 "current sleeping time" will have the duration since the responding pair has been powered off. (This field is valid only when the current mode field 53 is "1.") The field "data verification option" specifies whether data verification operations are to be performed. Preferably, a "0" in field 56 means data verification will not be performed, while a "1" means that data verification will be performed in an intermittent sequence for the corresponding disk pair. The "divided sequence" indicates the portion of the disk drive upon which data is to be verified during a given operation, for example, a cylinder. The specific unit of verification is encoded within field 57. In field 57 a "0" can be used to designate a logical cylinder, and a "1" maybe used to designate eight cylinders. The specific units will depend upon the particular implementation chosen.

The field "last checked address" 58 is used to identify the address of the portion of the disk pair that was checked in the latest data verification operation. Each time a data verification operation is performed, this field is updated. The "idle condition" field 59a identifies the status of the pair while it is idle; in other words, designating whether the pair in operation is in normal mode, but not processing I/O requests. As above, the particular usage of this field will depend on the particular implementation. In the preferred embodiment the final field "power off criterion" 59b for the management table 50 shows the criterion by which the responding pair will be determined to be powered off. Although the usage of this field is dependent upon the particular implementation, typically it will be a measure of the maximum duration of idle time before power down is performed.

Figure 3:
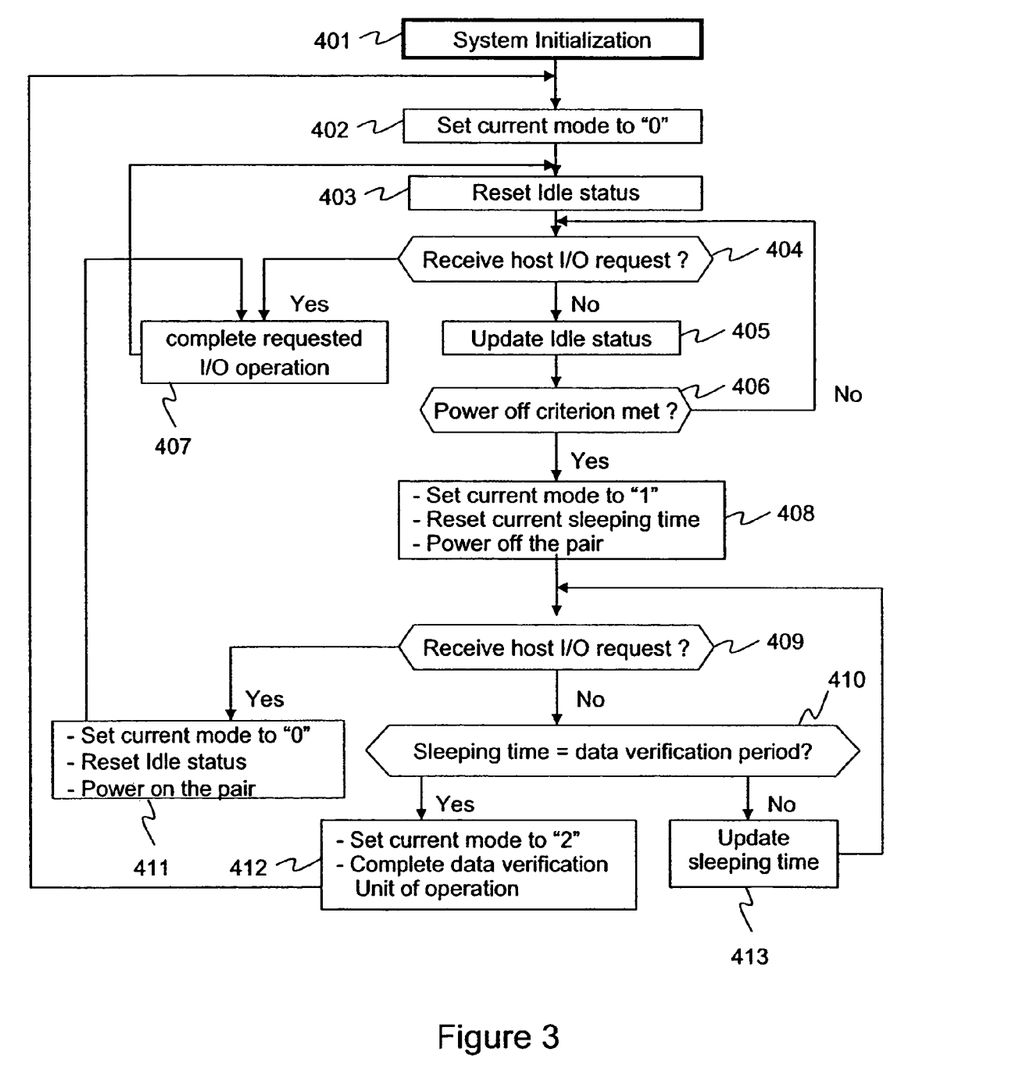
FIG. 3 illustrates a typical verification log.

FIG. 3 is a flowchart illustrating a preferred method of operation of the system depicted in FIG. 1. This flowchart illustrates the operation of a mirrored pair 100 in normal mode. After being turned on, the system is initialized 401, and at that time or shortly thereafter, the current mode field 53 is set to "0" t step 402 by microprocessor 17. The idle status field 59a is also reset as shown by step 403. The system then moves to step 404 where it awaits host I/O requests. If such a request is received, microprocessor 17 processes the request with disk drive pair 100 as shown at step 407. When the processing is completed, system status reverts back to step 403.

If no I/O request is received, then the processor 17 updates the idle status 59a as shown by step 405 and checks if the current status 59a conforms with the criterion 59b at step 406. If the power off criterion is not met, the idling process of steps 404, 405, and 406 continues to repeat. When the power off criterion 59b is met, then the current mode field 53 is reset to "1" and the current sleeping time is reset. The pair is then turned off, as shown by step 408.

Events that occur for I/O requests made to disk drive pairs which are off are shown in the lower portion of FIG. 3. In this situation an I/O request is received from a host computer 1 to the pair 100 and detected at step 409. Upon detection the processor 17 sets the current mode field to "0" and has the pair turned on and the idle status reset. Operation then transitions to step 407 to complete the I/O operation.

In the usual case, no I/O operation will be received from the host, and operation will transition to step 410. At this step processor 17 checks to determine whether the sleeping time has reached the data verification preset period at step 410. If the result is "no," then the processor updates the sleeping time 55 and repeats the iterations of step 409 and 410. On the other hand, if the answer is "yes," then the processor sets the current mode to "2" and proceeds with the data verification process 412. The details of the verification process are described below.

Figure 4:
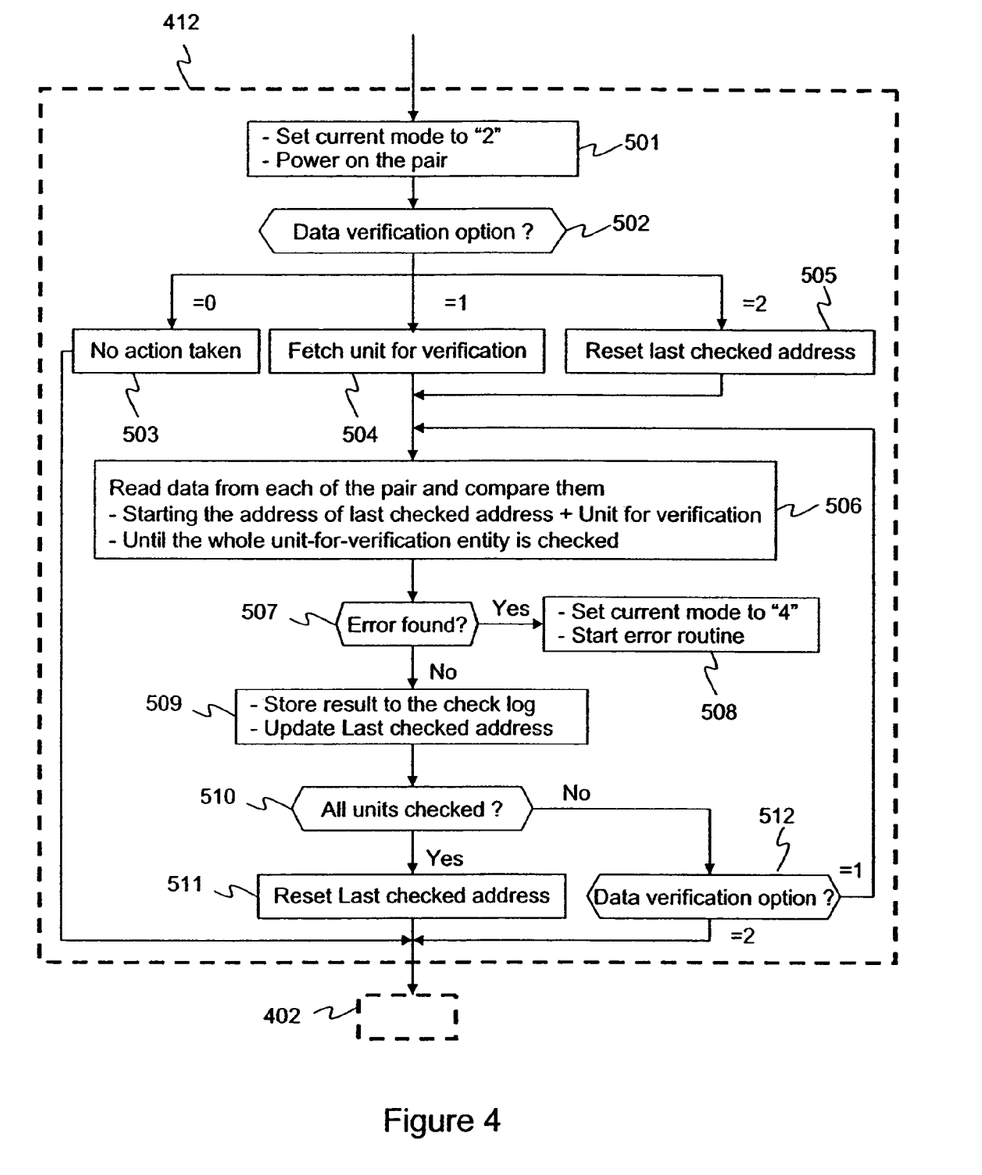
FIG. 4 is a flowchart illustrating a first portion of the operation of the system shown in FIG. 1.
Figure 5:
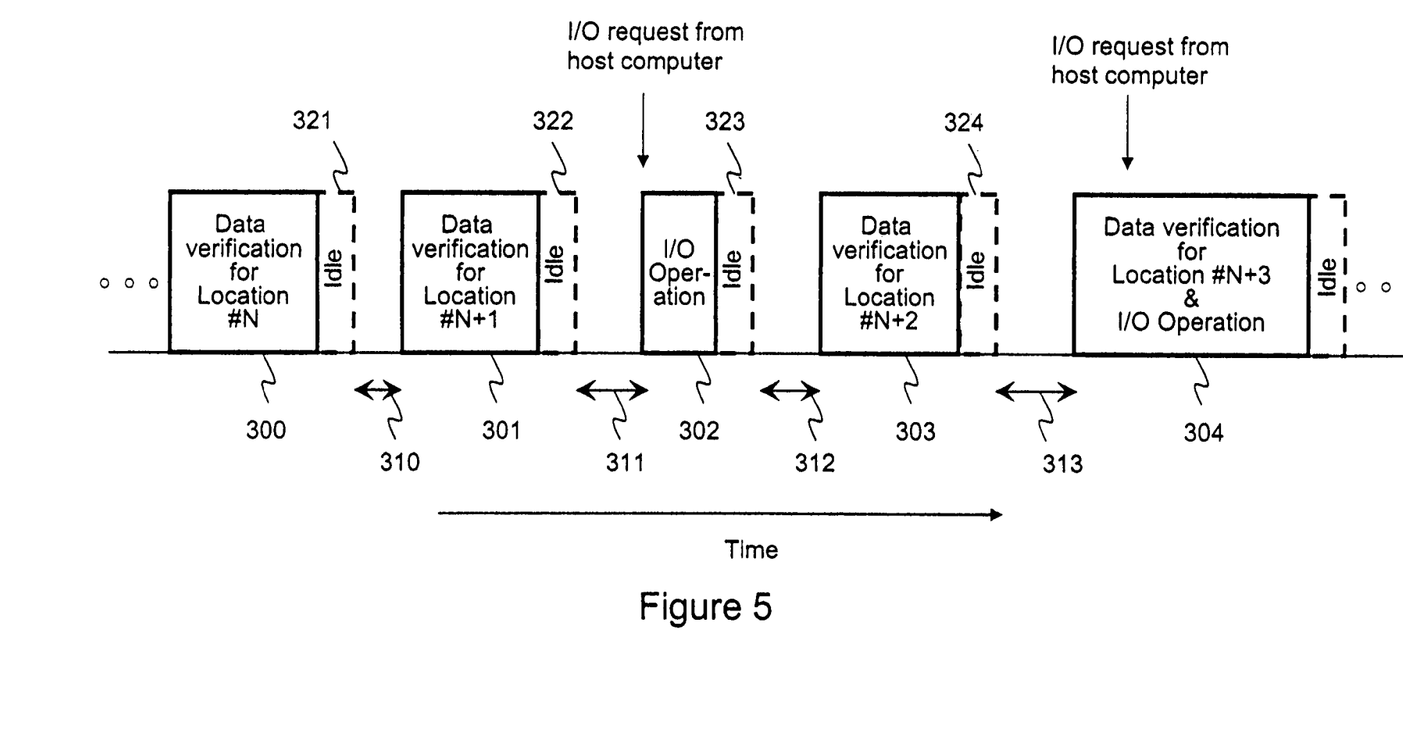
FIG. 5 is a flowchart illustrating additional operations for the system shown in FIG. 1.

FIG. 4 is a flowchart illustrating in detail the operations carried out at step 412 in FIG. 3. As shown at step 510, after setting the current mode field 53 to "2," the pair is turned on and the data checking verification field 56 is detected at step 502. If field 56 is "0," no action is taken and the process repeats from step 402 (as shown in step 503). If the data verification field detected at step 502 is not "0," then field 57 is fetched. As shown at step 504 and 505, if the field is "1," then the "unit for verification" is retrieved; if the field is "2," then the "last checked address" field 58 is reset, as shown at step 505. Control then moves to step 506. In each of these cases, the processor 17 repeats reading the data from each of the pair of drives 100 and compares them with each other, as shown at step 506, until the process is complete. Completion of the process will depend upon the "unit for checking" field 57 and the "last checked address" field 58. If there is any error as detected at step 507, the processor sets the "current mode" field 53 to "4" and starts an error routine at step 508. On the other hand, if no errors are detected, then at step 509 the processor updates the last-checked address field 58 and stores the results in the check log 51 (see FIG. 1). The verification log is shown in FIG. 5 and is discussed below. At step 510 a determination is made as to whether all units have been checked. If they have, then the last-checked address field 58 is reset, as shown at step 511, and the process returns to step 402 in FIG. 3. If not all of the units have been checked, process flow moves to step 512 where a determination is made of whether other units need to be checked. In performing this determination, the data-verification option field is checked, and if found to be "1," the process is repeated from step 506. If that field is "2," the process is repeated beginning at step 402 in FIG. 3.

If while the data verification process shown in block 412 is being performed, a new I/O request is received from the host computer, the processing of this I/O request is given priority. The data verification operations are then performed when the processor 17 and/or the mirrored pair 100 are not involved in host I/O processing.

FIG. 5 is a diagram illustrating the time sequence for a typical operation on a mirrored pair in the normal mode. Time is indicated as passing in the diagram as operations move from left to right. Once a data verification operation 300 is complete, there may be an idle period 321. After a certain period of time when the power off criterion is satisfied, the mirrored pair will be turned off until after the data verification period 310 has elapsed. After this period has passed, the mirrored pair is turned on, and data verification 301 for the next unit is started. As before, once this process is complete, there may be an idle period 322 followed by a sleep 311.

If an I/O request from the host computer to the mirrored pair is received before the data verification period expires, for example as shown by 302, then to avoid delay, the mirrored pair is powered on, and the I/O request processed. Once this is complete, another idle period 323 begins, followed by an inactive period 312. As before, if no I/O request occurs during data verification period 312, the process for the next unit 303 is then performed, again followed by an idle period 324 and a sleep period 313. As illustrated near the right-hand side of the diagram, if, during the data verification operations an I/O request is received, the data verifications operations are performed in the background. This requires a longer period being required than data verification operations performed in the foreground, such as operations 300, 301 and 303.

Figure 6:
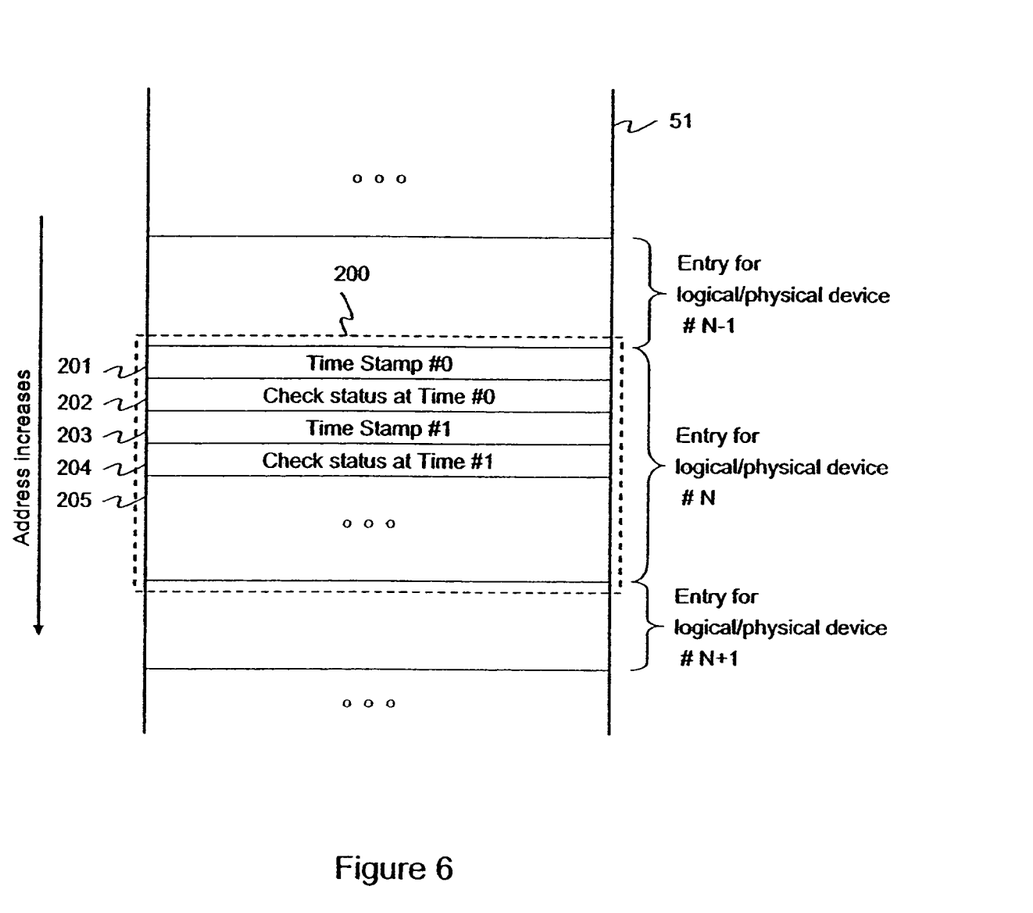
FIG. 6 illustrates the time sequence for a typical operation on a pair of disk drives.

FIG. 6 is a diagram illustrating the log 51 originally depicted in FIG. 1. The log is typically maintained within the service processor 5, and stored the results of the data verifications operations. In the depicted embodiment, log 51 has entries corresponding to the verification results for each of the corresponding mirrored pairs. The particular format, of course, will depend upon the particular implementation, and formats other than as depicted in FIG. 6 can readily be employed. The implementation shown in FIG. 6 is a simple log format in which results for all pairs are stored in chronological order, together with a time stamp, irrespective of the ID of the particular pair. In this format, it is necessary that the pair ID is associated with the verification results.

In a typical example such as entry 200, pairs of data "time stamp" and "check status" are stored as illustrated. Once the log is filled, any desired algorithm may be used to replace entries to store new information, for example, by deleting the oldest log entry present in the register. For implementations in which divided verification, whether based on cylinders, sectors, or other basis, the "check status" field will typically include the "last checked address" 58 in addition to the results.

Figure 7:
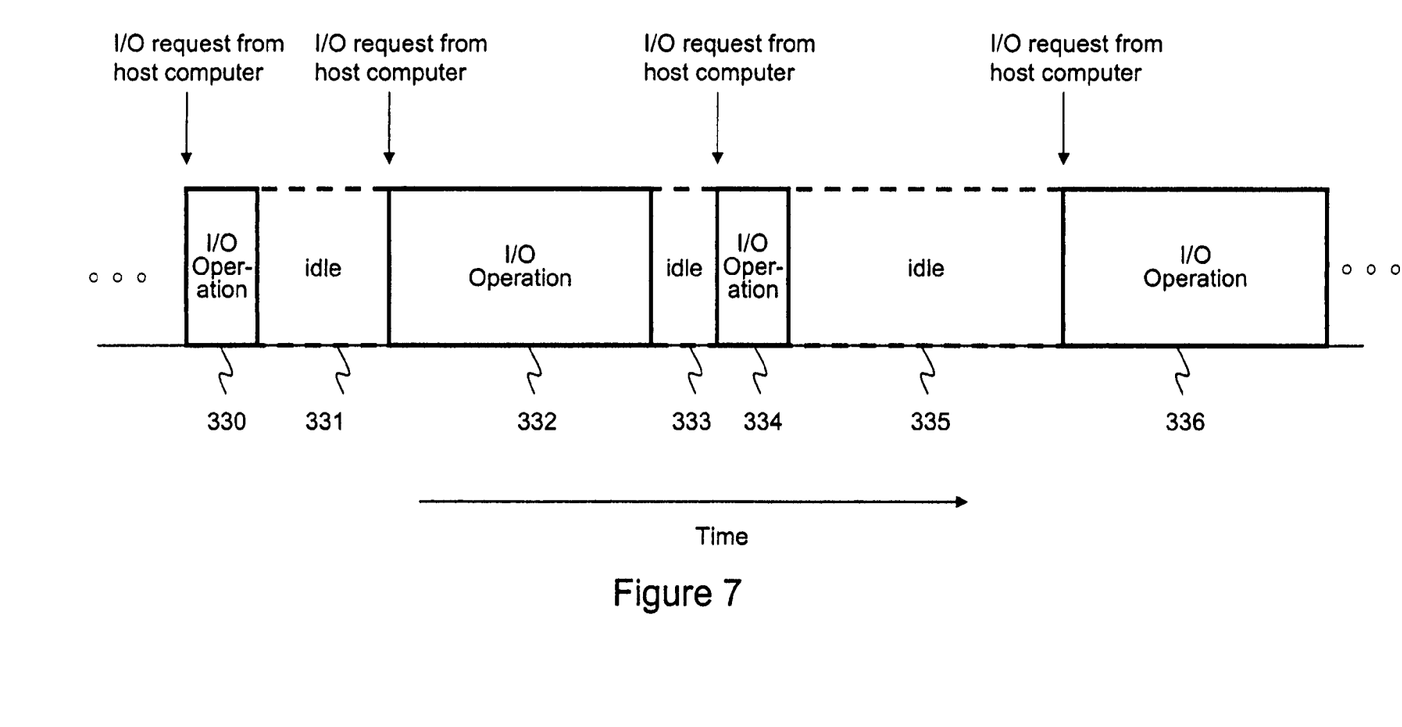
FIG. 7 illustrates a typical time sequence for another operation mode.

FIG. 7 is a timing diagram similar to FIG. 5. FIG. 7, however, illustrates the system in a full operation mode. The full operation mode, as mentioned above, is most useful when quick searching over a large amount of archived data is required. The full operation mode prevents power on and power off sequences which require substantial time and have a significant impact on disk performance and access time. If the system is employed to archive information for the purposes of regulatory compliance, auditing of the stored records is a typical situation when full operation mode is useful. As shown by FIG. 7, the sleep mode is illuminated. In addition, the figure illustrates typical large amounts of I/O operations. In the illustrated situation I/O operations 330, 332, 334 and 336 are processed with idle periods 331, 333 and 335 intervening. Note that no data verification operations are performed in this mode.

Figure 8:
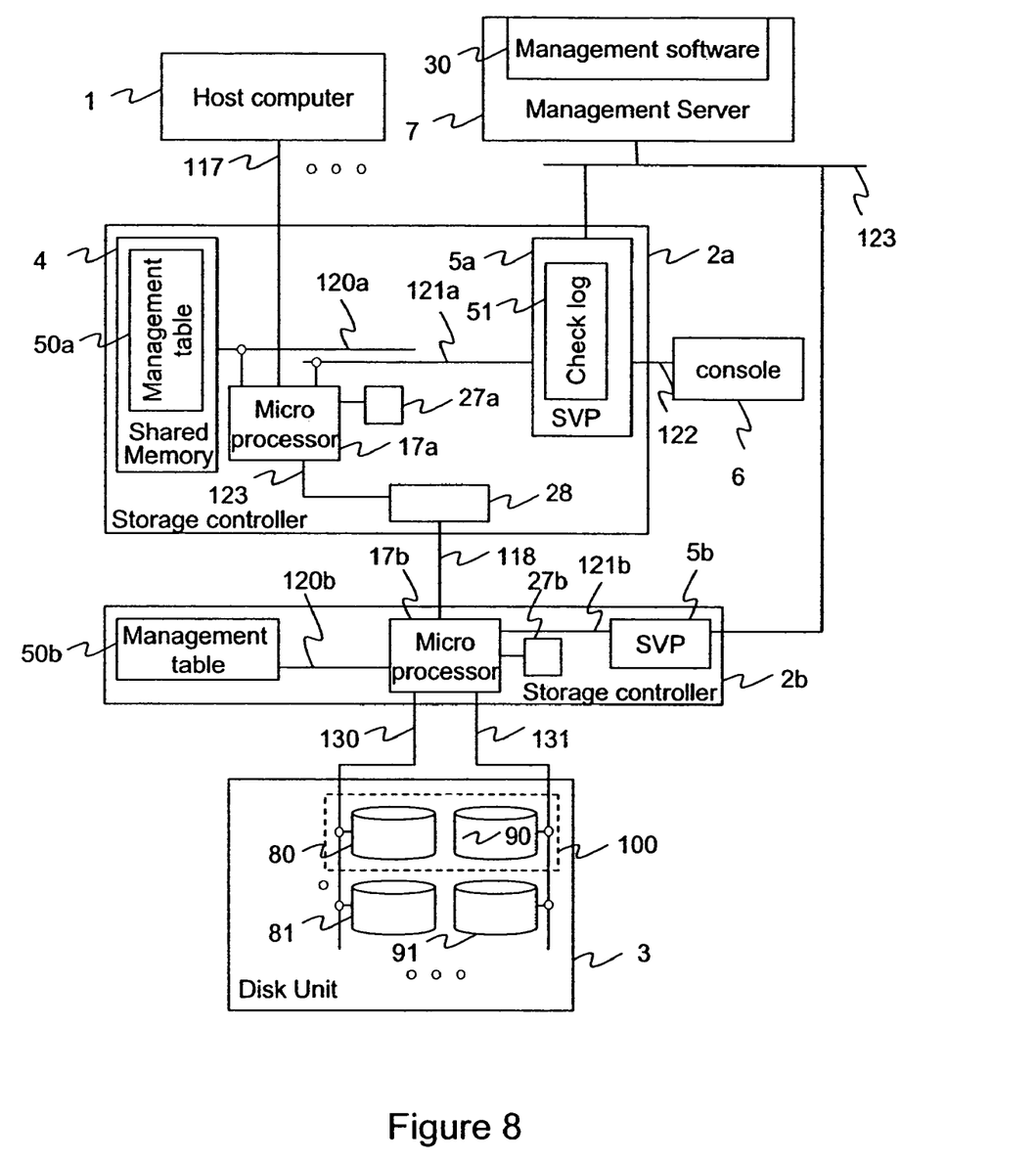
FIG. 8 is a block diagram illustrating a system configuration for another embodiment of the invention.

FIG. 8 is a block diagram illustrating another embodiment of the data protection system for disk arrays. The primary difference between this configuration and the configuration depicted in FIG. 1 is that the storage controller 2a is connected via line 118 to another storage controller 2b. (In the implementation of FIG. 1, the storage controller was connected directly to the disk units without an intervening storage controller.) The advantage of the configuration shown in FIG. 8 compared to that of FIG. 1 is that the system features which are difficult or costly to implement can be embedded within controller 2a, while controller 2b lacks most of the capability, but is inexpensive to implement. In the implementation shown in FIG. 8, processor 17a controls the logical devices which have been translated from the physical devices coupled to processor 17b. The device 28, preferably another microprocessor, resolves the differences resulting from this configuration. In the illustrated embodiment, storage controller 2b has the capability of turning on and off the disk drives, and management table 50b and SVP 5b are equipped in the manner necessary to support that functionality.

One potential issue arising with respect to the configuration of FIG. 8 involves the direct control of the disk unit 3 by microprocessor 17b within storage controller 2b. If I/O requests from storage controller 2a are received by controller 2b, the disk drives that the responding logical devices are mapped to are powered on, even if they have been turned off. Thus, the combination of storage controllers 2a and 2b will operate in a manner similar to that described above.

Figure 9:
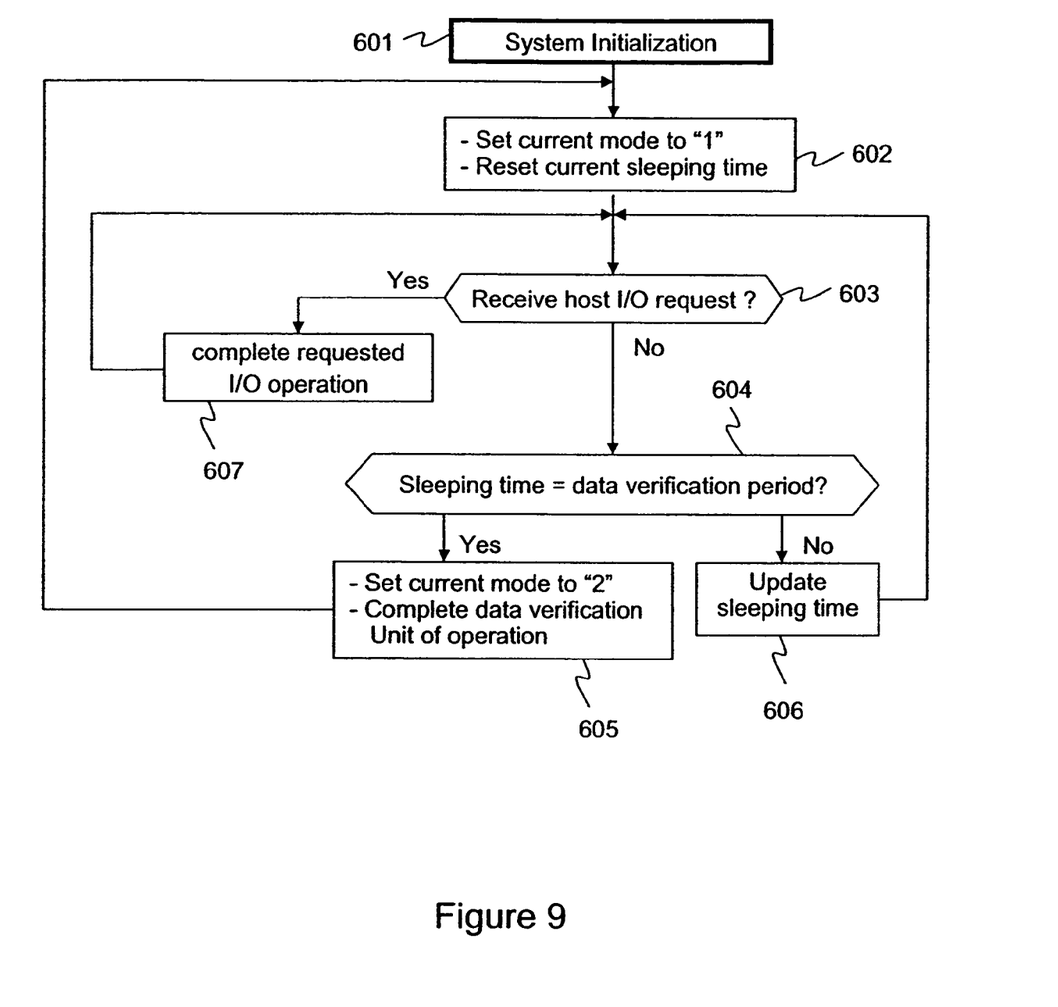
FIG. 9 is a flowchart illustrating operations within the storage controller.

FIG. 9 is a flowchart illustrating operation steps for the embodiment depicted in FIG. 8. The presence of storage controller 2b means that storage controller 2a does not need to have the capability of powering on and off the disk drives. This aspect of the management of storage 3 is handled by storage controller 2b. As shown in FIG. 9, after the system is initialized 601 and has its mode set to "1," a test is made to determine whether an I/O request has been received. If yes, the I/O request is performed, as shown by step 607. If no, a determination is made as to whether the sleeping time has been long enough to require data verification. If it is determined that data verification should take place, then step 605 is performed. If not, then step 606 is performed. Following steps 605 and 606, control is returned to an earlier portion of the flowchart.

Figure 10:
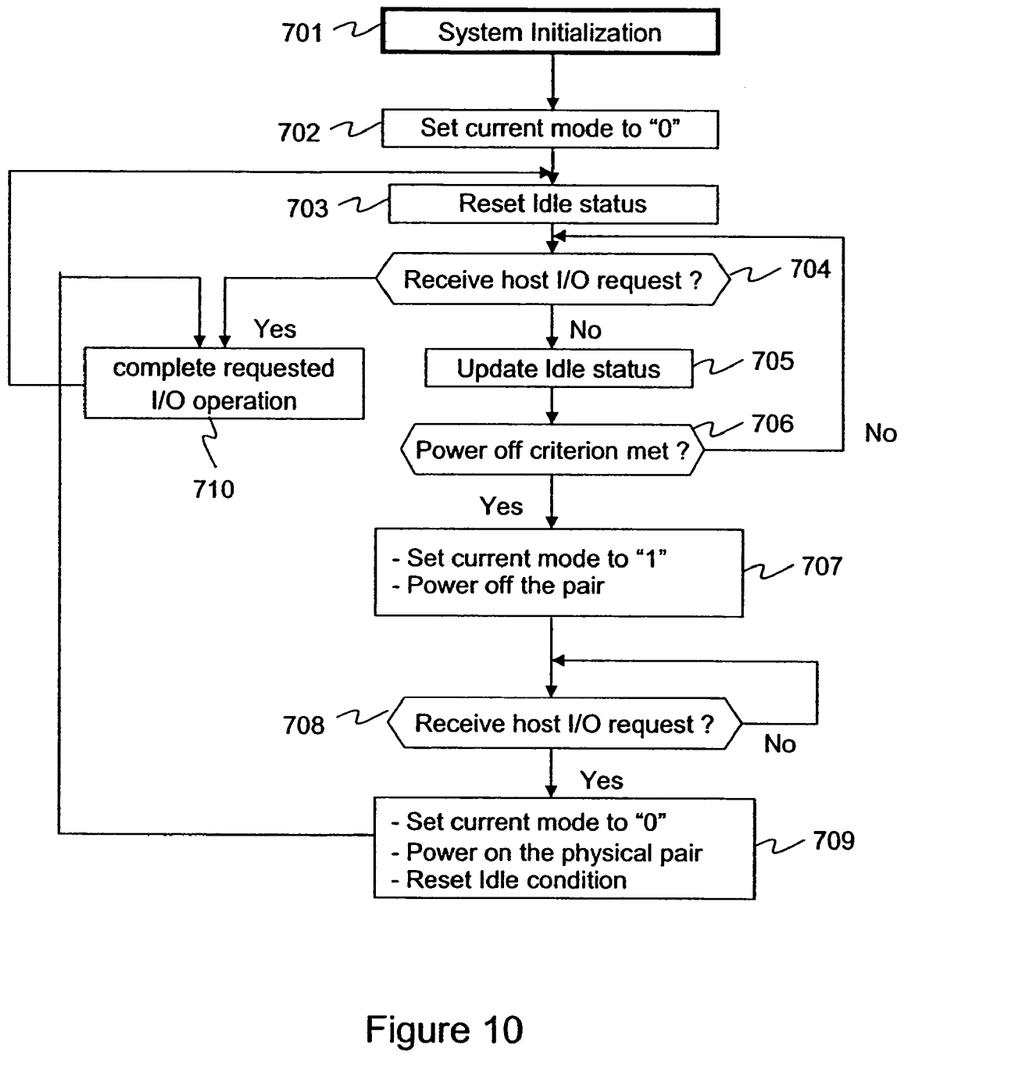
FIG. 10 illustrates additional operations within the storage controller.

FIG. 10 is a flowchart similar to the one depicted in FIG. 4. The flowchart in FIG. 10 illustrates the procedure carried out in within disk unit 3 for the embodiment shown in FIG. 8. As shown in FIG. 10, following system initialization at step 701, the current mode is set to "0" at step 702. Then at step 703 idle status is reset, and a determination is made as to whether a host I/O request is received at step 704. If yes, then the I/O request is acted upon and completed at step 710. If no, then the idle status is updated at step 705, and it is determined at step 706 whether to turn the power off for that disk drive. If not, the system recycles to step 704. On the other hand, if a decision is made to turn the power off for that disk drive, then as shown by step 707 the drive and its mirrored pair are turned off, and a further test is made as to whether an I/O request is received at step 708. If an I/O request is received, as shown by step 709, then the mirrored pair is turned on and the idle condition reset.

The foregoing has been a description of the preferred embodiments of the invention. It will be appreciated that various modifications may be made to the implementation of the invention without departing from its scope, as defined by the following claims.

What is claimed is:

1. In a storage system having a plurality of disk drives each with stored data, a system for verifying integrity of the stored data comprising:

a management information storage having data entries therein associated with the plurality of disk drives, the entries indicating whether data stored in the disk drives have been verified;

a processor coupled to the management information storage and selectively coupleable to ones of the plurality of disk drives for performing verification operations on the data stored therein, and storing the results in the management information storage; and a controller coupled to the processor to enable changes in verification procedures, wherein each disk drive is selectively operated in accordance with a mode of operation thereof, including a normal mode of operation and a full mode of operation, the controller being configured to receive from a computer console connected thereto a user-specified indication of one or more disk drives and a user-specified mode indicative of either the normal mode of operation or the full mode of operation to be applied to the one or more disk drives specified by a user, wherein a disk drive in the normal mode of operation is powered OFF when a power OFF criterion is satisfied, and is powered ON in response to receiving an I/O request or in response to an indication to perform a data verification operation, wherein a disk drive in the full mode of operation is always powered ON and does not perform data verification.

2. A system for verifying the integrity of the stored data as in claim 1 wherein the management information storage comprises a table having entries therein related to a mode indicative of the mode of operation of each disk drive.

3. A system for verifying the integrity of the stored data as in claim 2 wherein the mode comprises an indication of whether the disk drive is powered ON, powered OFF, or in a data verification operation.

4. A system for verifying the integrity of the stored data as in claim 3 wherein the mode further comprises an indication of time since the disk drive was last in operation.

5. A system for verifying the integrity of the stored data as in claim 3 wherein the mode comprises an indication of the extent to which data on the disk drive has been checked.

6. A system for verifying the integrity of the stored data as in claim 1 wherein the management information storage maintains a log of all of the data verification performed for each disk drive.

7. A system for verifying the integrity of the stored data as in claim 6 wherein the management information storage further includes security to reduce potential tampering with the data entries.

8. A system for verifying the integrity of the stored data as in claim 1 wherein the plurality of disk drives are logical devices.

9. A system for verifying the integrity of the stored data as in claim 1 wherein the verification operations may be performed concurrently with I/O operations.

10. In a storage system having a plurality of disk drives each with stored data, a system for assuring the integrity of the stored data comprising:

a management information storage having data entries therein associated with the plurality of disk drives, the entries indicating whether data stored in the disk drives have been verified;

a processor coupled to the management information storage and selectively coupleable to ones of the plurality of disk drives for performing verification operations on the data stored therein at selected times, and storing the results in the management information storage; and a controller coupled to the processor for enabling changes in the verification operations, the changes in the verification operations being performed by management software of the storage system, wherein each disk drive is selectively operated by the management software in accordance with a mode of operation of said each disk drive, including a normal mode of operation and a full mode of operation, the controller being configured to receive from a computer console connected thereto a user-specified indication of one or more disk drives and a user-specified mode indicative of either the normal mode of operation or the full mode of operation to be applied to the one or more disk drives specified by a user, wherein a disk drive in the normal mode of operation is powered OFF when a power OFF criterion is satisfied, and is powered ON in response to receiving an I/O request or in response to an indication to perform a data verification operation, wherein a disk drive in the full mode of operation is always powered ON and does not perform data verification.

11. A system for verifying the integrity of the stored data as in claim 10 further comprising a second controller configured to control the plurality of disk drives, the first controller further configured to control logical devices associated with the plurality of disk drives.

12. In a storage system having a plurality of disk drives each with stored data, a method for verifying the integrity of the stored data comprising:

receiving from a user a mode of operation, including a normal mode of operation and a full mode of operation;

receiving from the user information identifying one or more disk drives;

setting the mode of operation of each said one or more disk drives;

for a given disk drive in the normal mode of operation:

powering OFF the given disk drive when a power OFF criterion is satisfied;

powering ON the given disk drive in response to receiving an I/O request; and performing verification of the stored data of the given disk drive at selected times, wherein verification operations are performed concurrently with I/O operations in other disk drives;

storing results of the verification of the stored data in a management information storage having data entries therein associated with the plurality of disk drives, the entries indicating whether data stored in the disk drives have been verified; and changing the verification operations for a given disk drive in the full mode of operation, the given disk drive is always powered ON and does not perform verification.

13. A method as in claim 12 wherein the step of storing results further comprises storing the results in a table having entries therein related to a mode indicative of the mode of operation of each disk drive.

14. A method as in claim 13 wherein the mode comprises an indication of whether the disk drive is powered ON, powered OFF, or in a data verification operation.

15. A method as in claim 13 wherein the mode further comprises an indication of time since the disk drive was last in operation.

16. A method as in claim 13 wherein the mode comprises an indication of the extent to which data on the disk drive has been checked.

17. A method as in claim 12 wherein the step of storing further comprises storing a log of all of the data verification performed for each disk drive.

18. In a storage system having a plurality of disk drives each with stored data, a method for verifying the integrity of the stored data comprising:

receiving information from a user information indicative of one or more disk drives and information indicative of a selected mode of operation, the selected mode of operation being either a normal mode of operation or a full mode of operation;

setting each of the one or more disk drives to the selected mode of operation;
performing verification operations on the stored data only when the disk drive containing the stored data is in the normal mode of operation;
storing data entries in a management information storage, the data entries associated with the plurality of disk drives and indicating whether data stored in the disk drives have been verified;
changing the verification operations, the changes in the verification operations being performed by management software of the storage system; and
prohibiting the performance of verification when the disk drive containing the stored data is in the full mode of operation wherein a disk drive in the normal mode of operation is powered OFF when a power OFF criterion is satisfied, and is powered ON in response to receiving an I/O request or in response to an indication to perform a data verification operation,
wherein a disk drive in the full mode of operation is always powered ON and does not perform data verification.

* * * * *